(12) United States Patent
Golembeski et al.

(10) Patent No.: US 11,654,979 B1
(45) Date of Patent: May 23, 2023

(54) PASSIVELY ACTIVATED FLOW CONTROL DEVICE FOR A VEHICLE

(71) Applicant: GM Global Technology Operations LLC, Detroit, MI (US)

(72) Inventors: Adam Golembeski, Charlotte, NC (US); Andrew Thomas Cunningham, Cambridge, MA (US); David Clancy Caples, Huntington Woods, MI (US); Martin Bester, Huntersville, NC (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 17/526,065

(22) Filed: Nov. 15, 2021

(51) Int. Cl.
*B62D 35/00* (2006.01)

(52) U.S. Cl.
CPC ......... *B62D 35/008* (2013.01); *B62D 35/007* (2013.01)

(58) Field of Classification Search
CPC ...... B62D 25/02; B62D 35/00; B62D 35/007; B62D 35/008
USPC ........................................... 296/180.1, 180.5
See application file for complete search history.

(56) References Cited

U.S. PATENT DOCUMENTS

| | | | | |
|---|---|---|---|---|
| 4,384,630 A | * | 5/1983 | Steiner | B62D 35/00 296/180.1 |
| 4,460,055 A | * | 7/1984 | Steiner | B62D 35/00 296/180.1 |
| 7,152,908 B2 | * | 12/2006 | Shahbazi | B62D 35/00 296/180.1 |
| 7,364,220 B2 | * | 4/2008 | Shahbazi | B62D 37/02 296/180.1 |
| 10,017,214 B1 | * | 7/2018 | Schroeck | B62D 33/023 |
| 10,889,337 B1 | * | 1/2021 | Williams | B62D 33/023 |
| 2015/0345578 A1 | * | 12/2015 | Nightingale | F16D 65/847 188/264 AA |
| 2022/0355871 A1 | * | 11/2022 | Murray | B62D 35/00 |

* cited by examiner

*Primary Examiner* — Jason S Daniels
(74) *Attorney, Agent, or Firm* — Cantor Colburn LLP

(57) ABSTRACT

A passively activated flow control device including a valve body configured to be mounted in a vehicle. The valve body includes an inlet and an outlet. A valve member is arranged at the valve body for selectively opening and closing flow between the inlet and the outlet. The valve member is responsive to acceleration induced forces on the vehicle to shift from one of an open configuration and a closed configuration toward the other of the open configuration and the closed configuration.

20 Claims, 4 Drawing Sheets

PASSIVELY ACTIVATED FLOW CONTROL DEVICE FOR A VEHICLE

INTRODUCTION

The subject disclosure relates to the art of vehicles and, more particularly, to a passively activated flow control device for a vehicle.

Many vehicles have surfaces, such as spoilers, ducts, and the like that are designed to direct airflow along specific internal and external flow paths. Certain vehicles may have active flow control devices. Many active flow control devices adjust the flow surfaces in real time based on sensed parameters. While effective, these active flow control systems employ complex and costly sensors and drive mechanisms, such as hydraulics and electric motors, and rely on computer resources to detect vehicle operating conditions before flow control surfaces are adjusted to change airflow.

Controlling airflow can provide various benefits. For example, controlling airflow over a vehicle surface can lead to reduced drag or lift, improved handling, and increased range. Improving performance and, in particular, range, is desirable. Accordingly, it is desirable to provide a vehicle with a more affordable option for controlling air flow, in particular, an option that does not require costly and complex sensors, actuators, and controls.

SUMMARY

In one non-limiting example, a passively activated flow control device includes a valve body configured to be mounted in a vehicle. The valve body includes an inlet and an outlet. A valve member is arranged at the valve body for selectively opening and closing flow between the inlet and the outlet. The valve member is responsive to acceleration induced forces on the vehicle to shift from one of an open configuration and a closed configuration toward the other of the open configuration and the closed configuration.

In addition to one or more of the features described herein the valve member comprises a slider that selectively slides along an actuation path between the open configuration and the closed configuration.

In addition to one or more of the features described herein the actuation path is substantially linear.

In addition to one or more of the features described herein the slider includes a surface supporting a mass that is responsive to acceleration induced forces to shift the valve member along the actuation path.

In addition to one or more of the features described herein the slider includes an opening that selectively aligns with the one of the inlet and the outlet in the open configuration.

In addition to one or more of the features described herein the valve member comprises a rotary valve configured to rotate about an axis between the open configuration and the closed configuration.

In addition to one or more of the features described herein the rotary valve includes a plurality of openings and the outlet includes a plurality of outlet portions, the plurality of openings being aligned with the plurality of outlet portions when the valve member is in the open configuration.

In addition to one or more of the features described herein the rotary valve includes an outer surface and a mass mounted to the outer surface, the mass being responsive to acceleration induced forces to rotate the rotary valve about the axis.

In addition to one or more of the features described herein the passively activated flow control device includes one of a biasing element that selectively urges the valve member toward one of the open configuration and the closed configuration and a damper that controls a rate of change of the valve member between the open configuration and the closed configuration.

In another non-limiting example, a vehicle includes a body, a fluid inlet defined on the body, a fluid outlet defined on the body, and a passively activated flow control device arranged between the fluid inlet and the fluid outlet. The passively activated flow control device includes a valve body configured to be mounted in a vehicle. The valve body includes an inlet fluidically connected to the fluid inlet and an outlet fluidically connected to the fluid outlet. A valve member is arranged at the valve body for selectively opening and closing flow between the inlet and the outlet. The valve member being responsive to acceleration induced forces on the vehicle to shift from one of an open configuration and a closed configuration toward the other of the open configuration and the closed configuration.

In addition to one or more of the features described herein the valve member comprises a slider that selectively slides along an actuation path between the open configuration and the closed configuration.

In addition to one or more of the features described herein the actuation path is substantially linear.

In addition to one or more of the features described herein the slider includes a surface supporting a mass that is responsive to acceleration induced forces to shift the valve member along the actuation path.

In addition to one or more of the features described herein the slider includes an opening that selectively aligns with the one of the inlet and the outlet in the open configuration.

In addition to one or more of the features described herein the valve member comprises a rotary valve configured to rotate about an axis between the open configuration and the closed configuration.

In addition to one or more of the features described herein the rotary valve includes a plurality of openings and the outlet includes a plurality of outlet portions, the plurality of openings being aligned with the plurality of outlet portions when the valve member is in the open configuration.

In addition to one or more of the features described herein the rotary valve includes an outer surface and a mass mounted to the outer surface, the mass being responsive to acceleration induced forces to rotate the rotary valve about the axis.

In addition to one or more of the features described herein the passively activated flow control device includes one of a biasing element that selectively urges the valve member toward one of the open configuration and the closed configuration and a damper that controls a rate of change of the valve member between the open configuration and the closed configuration.

In addition to one or more of the features described herein a duct connects the fluid inlet and the fluid outlet. The passively activated flow control device is arranged in the duct.

In addition to one or more of the features described herein a bypass duct includes a bypass inlet arranged between the fluid inlet and the fluid outlet and a bypass outlet, the bypass duct being open when the passively activated flow control device is in the closed configuration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
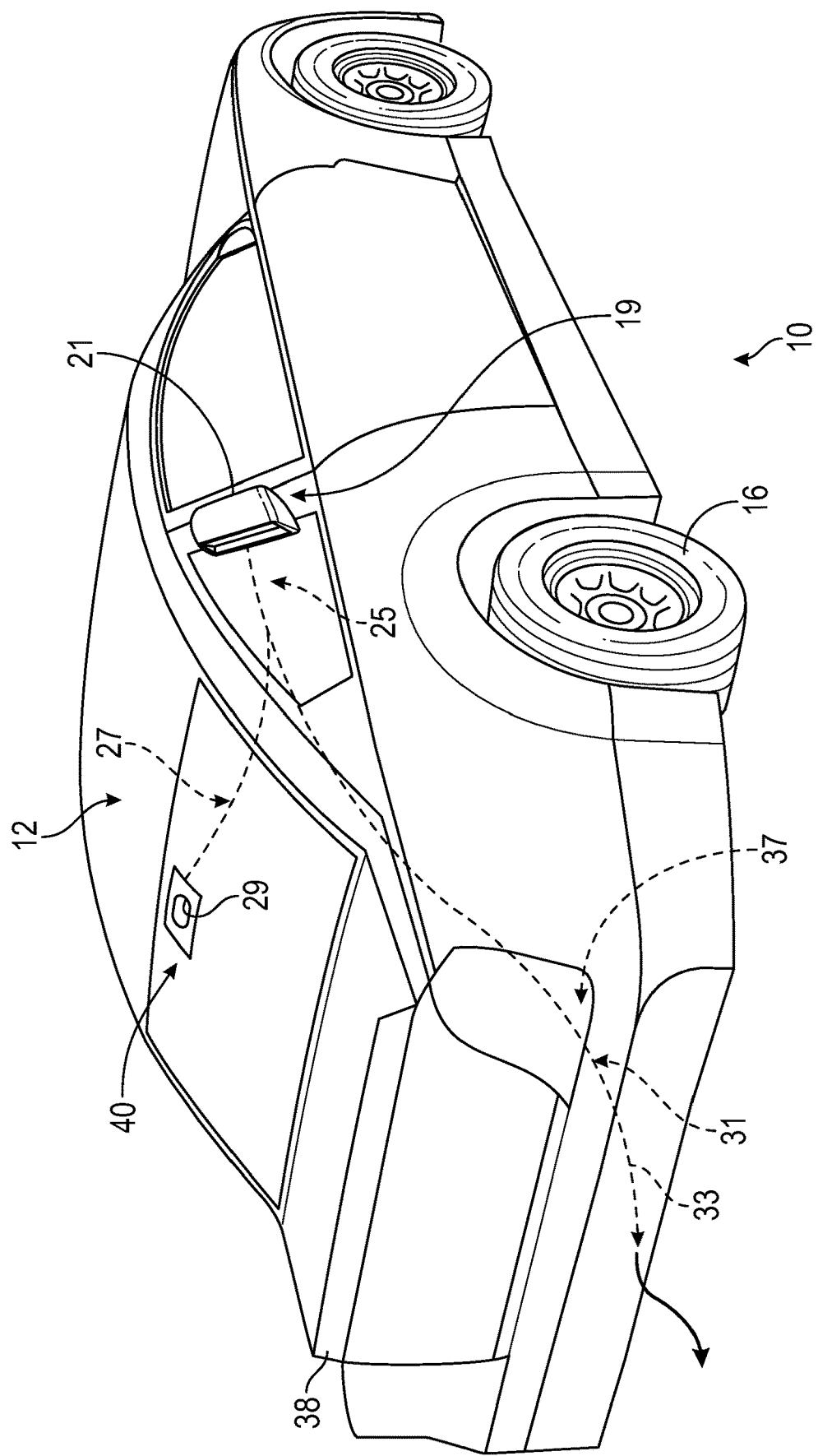
FIG. 1 depicts a vehicle including a passively activated flow control device in a closed configuration, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
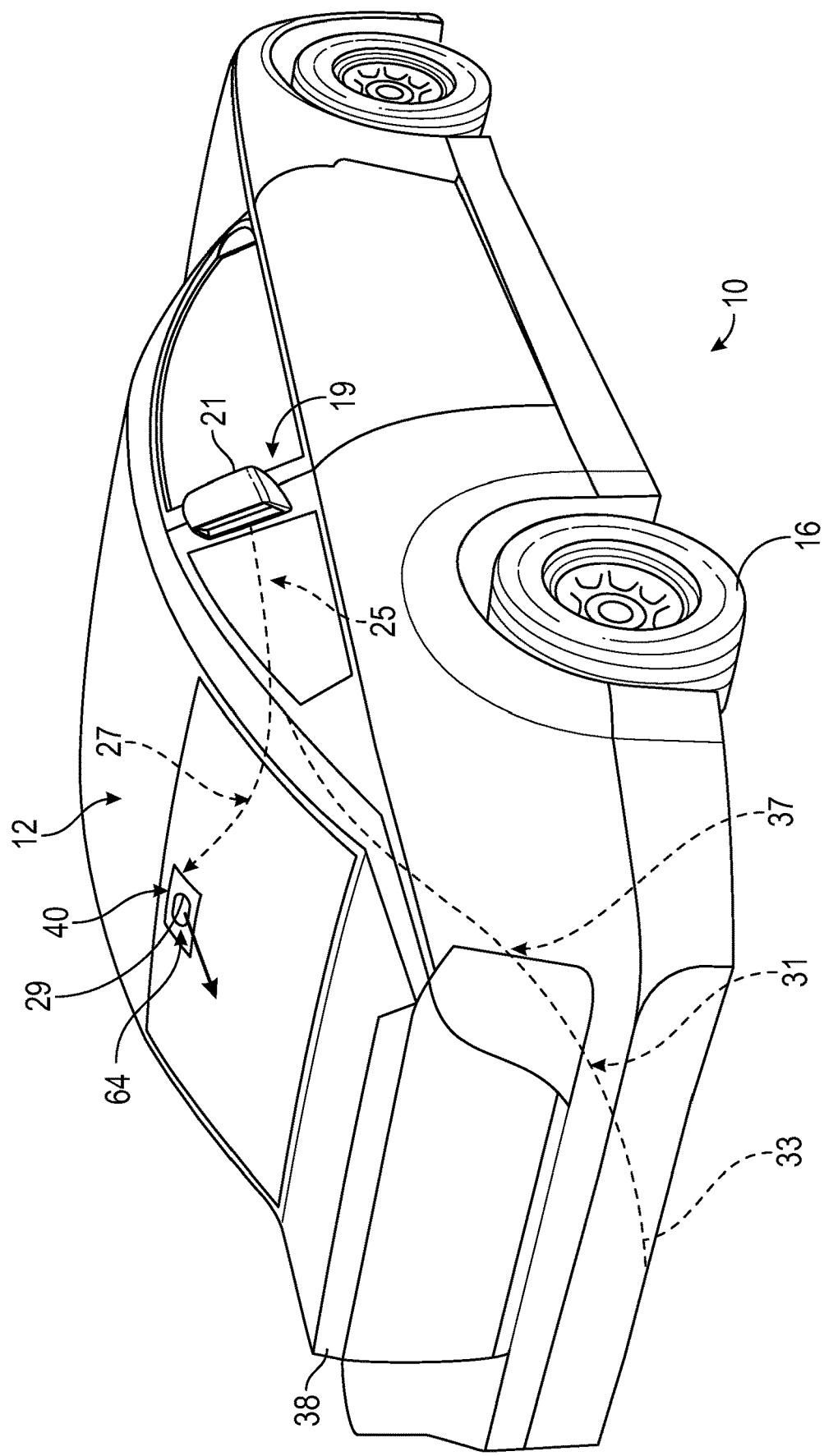
FIG. 2 depicts a vehicle including a passively activated flow control device in an open configuration, in accordance with a non-limiting example.

A vehicle, in accordance with a non-limiting example, is indicated generally at 10 in FIGS. 1 and 2. Vehicle 10 includes a body 12 supported on a frame (not shown) and a plurality of wheels, one of which is indicated at 16. In a non-limiting example, body 12 includes an intake 19 having a fluid inlet 21. Intake 19 may receive and direct an airflow over one or more internal and/or external surfaces of vehicle 10 as will be detailed more fully herein. In a non-limiting example, body 12 also includes a duct assembly 25 (FIG. 3) having a first outlet portion 27 having a first fluid outlet 29 and a second outlet portion 31 having a second fluid outlet 33.

Figure 3:
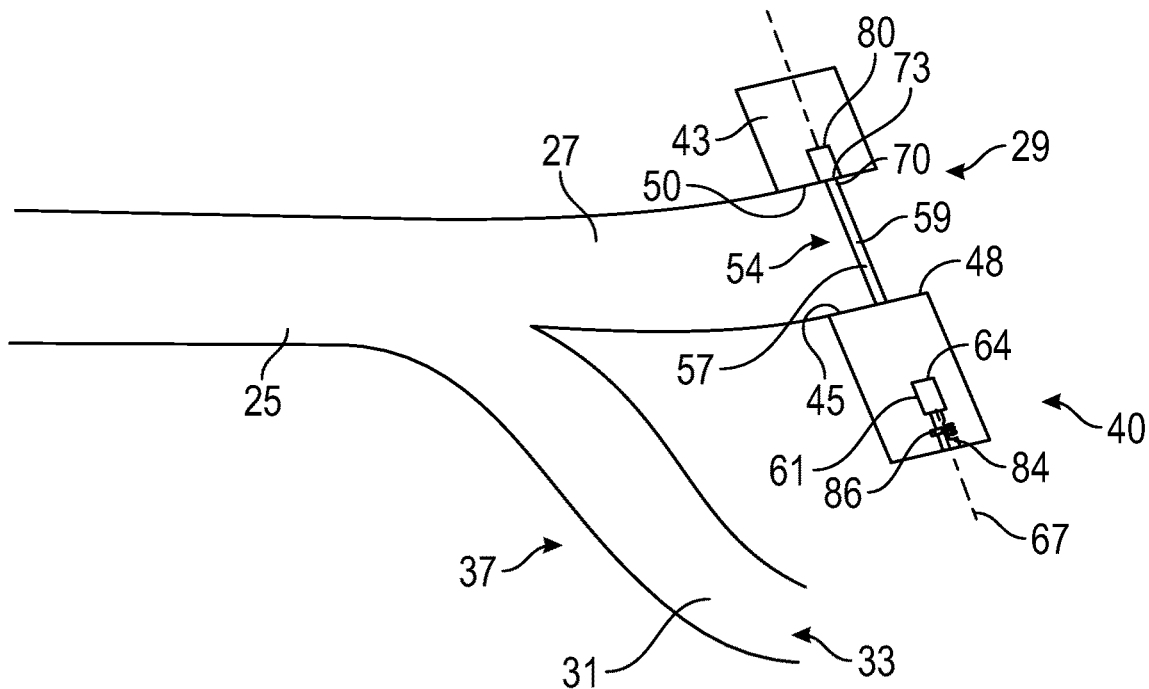
FIG. 3 depicts a schematic view of a duct including a passively activated flow control device in the form of a slider shown in a closed configuration, in accordance with a non-limiting example.
Figure 4:
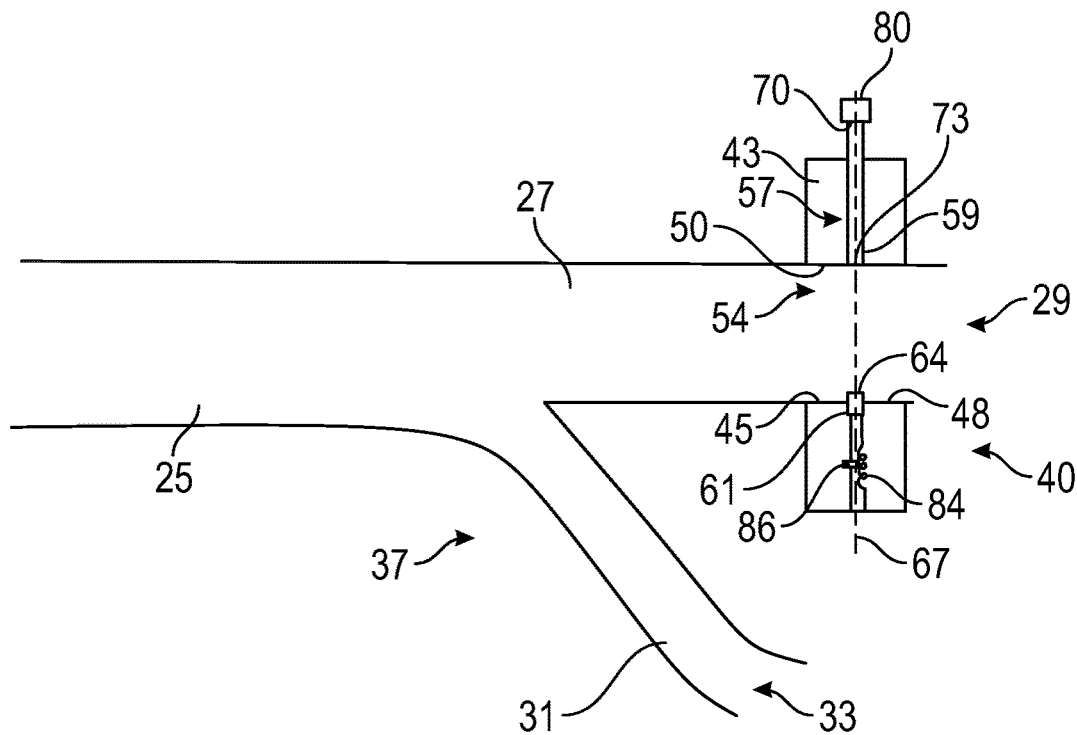
FIG. 4 depicts a schematic view of the slider of FIG. 3 in an open configuration, in accordance with a non-limiting example.

Referring to FIGS. 3 and 4, and with continued reference to FIGS. 1 and 2, duct assembly 25 extends between fluid inlet 21 and first outlet portion 27. Second outlet portion 31 defines a bypass duct 37 which is fluidically connected to duct assembly 25 and terminates at second fluid outlet 33. Fluid may flow from fluid inlet 21 through second outlet portion 31 during normal driving conditions. However, when forces, such as acceleration induced forces, on vehicle 10 change, fluid flow may pass through first outlet portion 27, exit first fluid outlet 29, and flow over a spoiler 38 to provide additional downward forces on body 12. A change in direction of the fluid flow, from second outlet portion 31 to first outlet portion 27 is facilitated by a passively activated flow control device 40 arranged at first fluid outlet 29.

In a non-limiting example, passively activated flow control device 40 includes a valve body 43 having an inlet 45 that is fluidically connected to fluid inlet 21 and an outlet 48 that is fluidically connected to first fluid outlet 29. A flow path 50 extends between inlet 45 and outlet 48. A valve member 54 is arranged in flow path 50. In a non-limiting example, valve member 54 takes the form of a slider 57 having a first portion 59 that selectively blocks first fluid outlet 29 and a second portion 61 having an opening 64 that selectively connects inlet 45 and outlet 48 allowing fluid to flow along flow path 50. In a non-limiting example, slider 57 changes position in vehicle 10 along an actuation path 67 which may be substantially linear. While shown in FIG. 2 as being substantially circular, opening 64 may take on any selected shape. At this point, it should be understood that the term "passively activated" refers to the lack of any electrical, mechanical, hydraulic, or other form of actuator that is used to move valve member 54. Valve member 54 is responsive to induced acceleration induced forces on vehicle 10.

In a non-limiting example, slider 57 includes an end section 70 having a surface 73 that supports a mass 80. Mass 80 possesses degrees of freedom which are partially independent of vehicle 10 and thereby is responsive to, for example, centripetal forces, or any other acceleration induced forces, in any axis or combination of axes, imparted on vehicle 10. That is, when vehicle 10 perceives forces of a selected magnitude, mass 80, in response to those forces, will move slider 57 along actuation path 67 causing passively activated flow control device 40 to transition from a closed configuration (FIG. 3) to an open configuration (FIG. 4). Mass 80 may be directly connected to slider 57 or, in other non-limiting example, may be connected to slider 57 through a linkage (not shown). In a non-limiting example, as mass 80 shifts due to acceleration induced forces, slider 57 transitions to the open configuration. As slider 57 transitions to the open configuration, a biasing element, shown in the form of a spring 84 is loaded. When the forces on vehicle 10 subside, spring 84 returns slider 57 along actuation path 67 causing passively activated flow control device 40 to transition back to the closed configuration. It should be understood that the inclusion of a biasing element as a spring 84 is optional. Other devices that may control a relative position of mass 80 in vehicle 10 may also be employed. In addition to controlling position, a rate of position change or slider 57 may also be controlled by, for example, a damper, such as shown at 86. Other systems for controlling a rate of change may also be employed.

Figure 5:
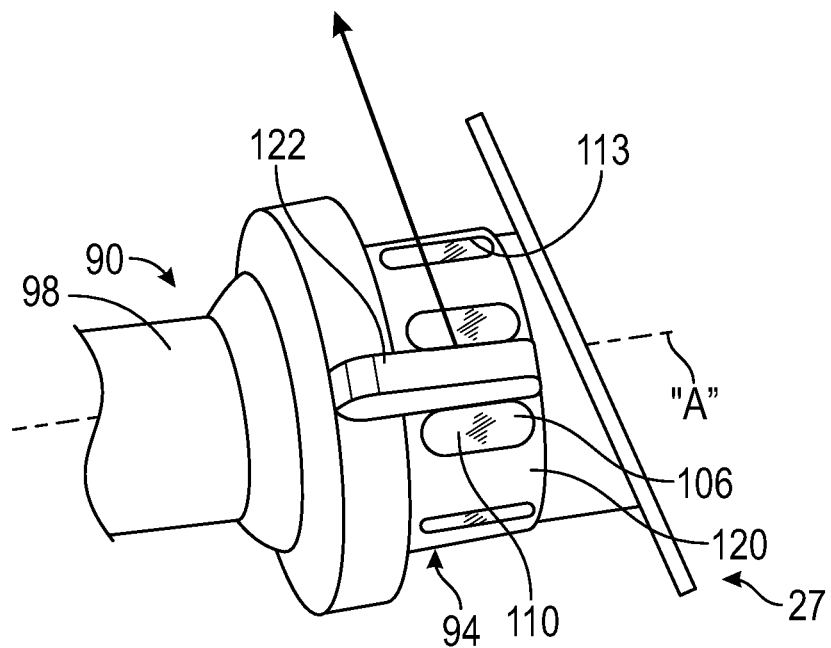
FIG. 5 depicts a passively activated flow control device in the form of a rotary valve shown in a closed configuration, in accordance with a non-limiting example.
Figure 6:
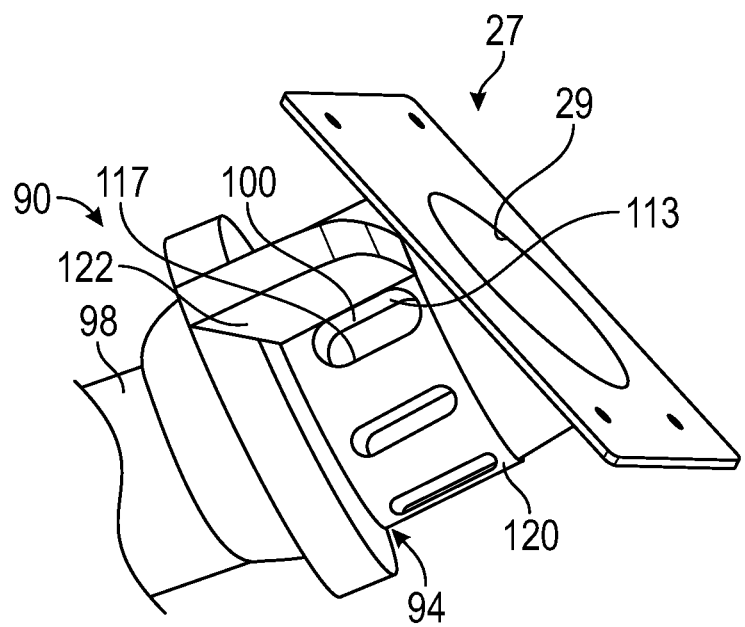
FIG. 6 depicts the rotary valve of FIG. 5 in an open configuration, in accordance with a non-limiting example.

Reference will now follow to FIGS. 5 and 6 in describing a passively activated flow control device 90 in accordance with another non-limiting example. Passively activated flow control device 90 includes a valve body 94 having an inlet 98 that is fluidically connected with fluid inlet 21 and an outlet 100 (FIG. 6) that is fluidically connected with, for example, first fluid outlet 29. A flow path (not separately labeled) extends between inlet 98 and outlet 100. In a non-limiting example, a valve member 106, which takes the form of a rotary valve 110, is arranged along the flow path.

In a non-limiting example, valve body 94 includes a plurality of openings, one of which is indicated at 113 and rotary valve 110 includes a plurality of opening portions, one of which is indicated at 117. While shown to possess an oblong shape, the particular shape of openings 113 and opening portions 117 may vary. Opening portions 117 are selectively brought into alignment with openings 113 to allow flow to pass from inlet 98 to outlet 100. That is, forces on vehicle 10, such as centripetal forces or other acceleration induced forces, cause rotary valve 110 to spin about an axis "A" brining opening portions 117 into alignment with corresponding ones of openings 113. Valve body 94 includes an outer surface 120 that supports a mass 122 which is connected to valve member 106. Mass 122 is responsive to forces on vehicle 10. That is, when exposed to, for example, centripetal forces or other acceleration induced forces, mass 122 drives valve member 106 about axis "A" causing passively activated flow control device 90 to transition from a closed configuration (FIG. 5) to an open configuration (FIG. 6) such that opening portions 117 align with openings 113. A biasing element (not shown) may urge valve body 94 back to the closed configuration.

At this point, it should be understood, that the non-limiting examples describe a flow control device that is responsive to forces perceived by a vehicle. while shown as directing fluid over a spoiler, the flow control device may be used in a wide variety of applications. For example, the flow control device may be responsive to induced longitudinal vehicle decelerations to open a flow path directing fluid in a heat exchange relationship onto brake components. By relying on external forces, the flow control device in accordance with non-limiting examples is less costly and requires no computer resources to control valve positions thereby leading to multiple efficiencies in vehicle manufacture, operation, and maintenance.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A passively activated flow control device comprising:
a valve body configured to be mounted in a vehicle, the valve body including an inlet and an outlet; and
a valve member arranged at the valve body for selectively opening and closing flow between the inlet and the outlet, the valve member being responsive to acceleration induced forces on the vehicle to shift from one of an open configuration and a closed configuration toward the other of the open configuration and the closed configuration.

2. The passively activated flow control device according to claim 1, wherein the valve member comprises a slider that selectively slides along an actuation path between the open configuration and the closed configuration.

3. The passively activated flow control device according to claim 2, wherein the actuation path is substantially linear.

4. The passively activated flow control device according to claim 2, wherein the slider includes a surface supporting a mass that is responsive to acceleration induced forces to shift the valve member along the actuation path.

5. The passively activated flow control device according to claim 2, wherein the slider includes an opening that selectively aligns with the one of the inlet and the outlet in the open configuration.

6. The passively activated flow control device according to claim 1, wherein the valve member comprises a rotary valve configured to rotate about an axis between the open configuration and the closed configuration.

7. The passively activated flow control device according to claim 6, wherein the rotary valve includes a plurality of openings and the outlet includes a plurality of outlet portions, the plurality of openings being aligned with the plurality of outlet portions when the valve member is in the open configuration.

8. The passively activated flow control valve according to claim 6, wherein the rotary valve includes an outer surface and a mass mounted to the outer surface, the mass being responsive to acceleration induced forces to rotate the rotary valve about the axis.

9. The passively activated flow control device according to claim 1, further comprising one of a biasing element that selectively urges the valve member toward one of the open configuration and the closed configuration and a damper that controls a rate of change of the valve member between the open configuration and the closed configuration.

10. A vehicle comprising:
a body;
a fluid inlet defined on the body;
a fluid outlet defined on the body; and
a passively activated flow control device arranged between the fluid inlet and the fluid outlet, the passively activated flow control device comprising:
a valve body configured to be mounted in the vehicle, the valve body including an inlet fluidically connected to the fluid inlet and an outlet fluidically connected to the fluid outlet; and
a valve member arranged at the valve body for selectively opening and closing flow between the inlet and the outlet, the valve member being responsive to acceleration induced forces on the vehicle to shift from one of an open configuration and a closed configuration toward the other of the open configuration and the closed configuration.

11. The vehicle according to claim 10, wherein the valve member comprises a slider that selectively slides along an actuation path between the open configuration and the closed configuration.

12. The vehicle according to claim 11, wherein the actuation path is substantially linear.

13. The vehicle according to claim 11, wherein the slider includes a surface supporting a mass that is responsive to acceleration induced forces to shift the valve member along the actuation path.

14. The vehicle according to claim 11, wherein the slider includes an opening that selectively aligns with the one of the inlet and the outlet in the open configuration.

15. The vehicle according to claim 10, wherein the valve member comprises a rotary valve configured to rotate about an axis between the open configuration and the closed configuration.

16. The vehicle according to claim 15, wherein the rotary valve includes a plurality of openings and the outlet includes a plurality of outlet portions, the plurality of openings being aligned with the plurality of outlet portions when the valve member is in the open configuration.

17. The vehicle according to claim 15, wherein the rotary valve includes an outer surface and a mass mounted to the outer surface, the mass being responsive to acceleration induced forces to rotate the rotary valve about the axis.

18. The vehicle according to claim 10, further comprising one of a biasing element that selectively urges the valve member toward one of the open configuration and the closed configuration and a damper that controls a rate of change of the valve member between the open configuration and the closed configuration.

19. The vehicle according to claim 10, further comprising a duct connecting the fluid inlet and the fluid outlet, the passively activated flow control device being arranged in the duct.

20. The vehicle according to claim 19, further comprising a bypass duct including a bypass inlet arranged between the fluid inlet and the fluid outlet and a bypass outlet, the bypass duct being open when the passively activated flow control device is in the closed configuration.

* * * * *